United States Patent
Grennhag (10) Patent No.: US 12,377,472 B2
(45) Date of Patent: Aug. 5, 2025

(54) TOOL HOLDING ARRANGEMENT, THREAD INSERT, ROTATABLE SHAFT AND DRILL UNIT

(71) Applicant: HUSQVARNA AB, Huskvarna (SE)

(72) Inventor: David Grennhag, Källered (SE)

(73) Assignee: HUSQVARNA AB, Huskvarna (SE)

( * ) Notice: Subject to any disclaimer, the term of this patent is extended or adjusted under 35 U.S.C. 154(b) by 659 days.

(21) Appl. No.: 17/433,726

(22) PCT Filed: Feb. 3, 2020

(86) PCT No.: PCT/SE2020/050097
§ 371 (c)(1),
(2) Date: Aug. 25, 2021

(87) PCT Pub. No.: WO2020/176023
PCT Pub. Date: Sep. 3, 2020

(65) Prior Publication Data
US 2022/0134446 A1    May 5, 2022

(30) Foreign Application Priority Data
Feb. 26, 2019  (SE) .................................. 1950247-5

(51) Int. Cl.
*B23B 31/11*  (2006.01)
*B23B 45/00*  (2006.01)
*B23B 51/04*  (2006.01)

(52) U.S. Cl.
CPC ............ *B23B 31/11* (2013.01); *B23B 45/003* (2013.01); *B23B 51/0473* (2013.01); *B23B 2231/04* (2013.01); *B23B 2260/056* (2013.01)

(58) Field of Classification Search
CPC ... B23B 31/11; B23B 45/003; B23B 51/0473; B23B 2231/04; B23B 2260/056; Y10T 279/15
See application file for complete search history.

(56) References Cited

U.S. PATENT DOCUMENTS 2,914,305 A    11/1959  Wink
3,784,316 A    1/1974   Bittern
(Continued)

FOREIGN PATENT DOCUMENTS

CN    201124246 Y    10/2008
DE    9216338 U1     1/1993
(Continued)

OTHER PUBLICATIONS

International Search Report and Written Opinion for International Application No. PCT/SE2020/050097 mailed May 5, 2020.
(Continued)

*Primary Examiner* — Eric A. Gates
(74) *Attorney, Agent, or Firm* — Burr & Forman LLP (57) ABSTRACT

The present disclosure relates to a tool holding arrangement (1, 1', 1") comprising a rotatable shaft (2, 2', 2") which is at least connectable to a tool driving power source (3) and comprises a first shaft thread (4, 4'). The tool holding arrangement (1, 1', 1) comprises a thread insert (5, 5') that comprises a first insert thread (6, 6'), adapted to engage the first shaft thread (4, 4') so as to form a first thread arrangement (4, 6; 4', 6'). The thread insert (5, 5') comprises a second insert thread (7) that is adapted to engage a tool thread (8) of a tool holding device (9) that is arranged to be screwed onto the second insert thread (7) so as to form a second thread arrangement (7, 8), the first thread arrangement (4, 6; 4', 6') having a higher pitch than the second thread arrangement (7, 8).

14 Claims, 7 Drawing Sheets

(56) References Cited

U.S. PATENT DOCUMENTS

| | | | |
|---|---|---|---|
| 4,099,889 A | 7/1978 | Vig | |
| 4,332,160 A * | 6/1982 | Baragar | G01N 33/24 |
| | | | 73/84 |
| 4,657,445 A | 4/1987 | Bossler | |
| 4,669,928 A * | 6/1987 | Mediavilla | B23B 51/0473 |
| | | | 408/206 |
| 4,745,831 A * | 5/1988 | Nutt | B25B 23/08 |
| | | | 81/53.2 |
| 4,856,944 A | 8/1989 | Reinauer | |
| 4,911,253 A | 3/1990 | Cliché | |
| 5,607,266 A | 3/1997 | Anderson | |
| 6,092,612 A * | 7/2000 | Brady | E21B 17/03 |
| | | | 279/103 |
| 6,565,291 B2 | 5/2003 | Harpaz et al. | |
| 6,951,081 B2 | 10/2005 | Bonshor | |
| 7,073,797 B2 | 7/2006 | Gaul | |
| 7,219,753 B2 | 5/2007 | Gaul | |
| 7,371,034 B2 | 5/2008 | Clark | |
| 7,721,754 B2 | 5/2010 | Knaus et al. | |
| 9,108,251 B2 | 8/2015 | Craig | |
| 11,458,550 B2 * | 10/2022 | Chen | B23B 51/126 |
| 2005/0147479 A1 | 7/2005 | Stojanovski | |
| 2008/0304923 A1 | 12/2008 | Lehto et al. | |
| 2009/0169317 A1 * | 7/2009 | Rae | B23B 51/0426 |
| | | | 408/204 |
| 2010/0111624 A1 * | 5/2010 | Seibold | B23B 51/0473 |
| | | | 408/239 R |
| 2014/0360334 A1 | 12/2014 | Singer-Schnoeller | |
| 2015/0360295 A1 | 12/2015 | Haimer | |
| 2018/0243888 A1 * | 8/2018 | Carlson | B23B 51/0473 |
| 2021/0023632 A1 * | 1/2021 | Chen | B23B 51/126 |

FOREIGN PATENT DOCUMENTS

| | | |
|---|---|---|
| EP | 2008744 A2 | 12/2008 |
| EP | 3505283 A1 | 7/2019 |
| WO | 0053362 A1 | 9/2000 |
| WO | 2014043505 A1 | 3/2014 |

OTHER PUBLICATIONS

Swedish Search Report and Office Action for Application No. 1950247-5 mailed Oct. 1, 2019.

* cited by examiner

TOOL HOLDING ARRANGEMENT, THREAD INSERT, ROTATABLE SHAFT AND DRILL UNIT

TECHNICAL FIELD

The present disclosure relates to a tool holding arrangement comprising a rotatable shaft which is at least connectable to a drill unit and comprises a first shaft thread.

BACKGROUND ART

Construction machines are for example used when renovating, reconstructing and extending buildings. Drill motors with rotatable drive shafts are normally used for drilling holes, for example for piping in floors and walls of buildings. Tool holders are used for connecting a tool, such as a drill, to the drive shaft, where the tool is attached to the tool holder; for example by means of welding.

The connection between a drive shaft and a tool holder is often made by means of threads, where the tool holder is screwed to the drive shaft. However, such an arrangement has disadvantages where the tool holder can be difficult to release from the drive shaft when a drill job is finished. Therefore, other types of connections between a drive shaft and a tool holder have been proposed.

In US 2004/0154838, a tool holder is mounted on a drive shaft for joint rotation therewith. The tool holder is adapted for mounting and dismounting of an annular core bit by means of coaxially arranged corresponding guide members, splines and conical surfaces which engage each other. In order to secure the mounting, a threaded flange on the core bit is screwed to corresponding threads on the tool holder.

WO 2014126525 discloses a tool holding arrangement that comprises a plurality of parts including sleeve flange parts.

However, there is still a need for a less complicated and easily managed tool holding arrangement which enables an increased ease for releasement of a tool holder from the drive shaft when a drill job is finished.

SUMMARY

It is an object of the present disclosure to provide an easily managed and uncomplicated tool holding arrangement which enables an increased ease for releasement of a tool holder from the drive shaft when a drill job is finished.

This object is achieved by means of a tool holding arrangement comprising a rotatable shaft which is at least connectable to a drill unit and comprises a first shaft thread. The tool holding arrangement comprises a thread insert that comprises a first insert thread, adapted to engage the first shaft thread so as to form a first thread arrangement, and a second insert thread adapted to engage a tool thread of a tool holding device that is arranged to be screwed onto the second insert thread so as to form a second thread arrangement. The first thread arrangement has a higher pitch than the second thread arrangement.

In this way, a tool can be released from a rotatable drive shaft more easily than previously possible.

According to some aspects, when the tool holding device is to be released, the first thread arrangement is adapted for an initial loosening of the tool holding device, and the second thread arrangement is adapted for a following release of the tool holding device.

In this way, an enhanced release procedure is enabled.

According to some aspects, the tool holding arrangement comprises an outer sleeve that is adapted to retain the thread insert in movable engagement with the rotatable shaft by being fastened to the rotatable shaft.

According to some aspects, the thread insert comprises a flange, and the outer sleeve comprises a first aperture, that admits passage of the flange, and a second aperture, that is adapted to retain the flange by means of a circumferentially running rim such that the thread insert is retained in movable engagement with the rotatable shaft when the outer sleeve is mounted to the rotatable shaft.

In this way, the thread insert is efficiently retained in movable engagement with the rotatable shaft.

According to some aspects, the outer sleeve comprises sleeve threads that are adapted to engage shaft outer threads such that the outer sleeve can be screwed onto the rotatable shaft.

In this way, the sleeve and the thread insert can easily be released from the rotatable shaft.

According to some aspects, the thread insert comprises a first bearing surface, the tool holding device comprises a second bearing surface and the outer sleeve comprises a third bearing surface against which the second bearing surface is secured before initial loosening of the tool holding device. The first bearing surface is adapted to engage the second bearing surface of the tool holding device during the following release of the tool holding device.

According to some aspects, a friction-reducing element is arranged at the first bearing surface.

In this way possible friction between the first bearing surface and the second bearing surface is reduced in favor of friction in the thread arrangements.

According to some aspects, the tool holding arrangement comprises a locking pin arrangement where at least one locking pin is positioned between the rotatable shaft and the thread insert. Said locking pin is adapted to run in a circumferentially running groove formed in the thread insert, such that the thread insert is retained in movable engagement with the rotatable shaft.

In this way, the thread insert is efficiently retained in movable engagement with the rotatable shaft.

According to some aspects, each locking pin is adapted to run in the circumferentially running groove between initial loosening of the tool holding device, and the following release of the tool holding device.

In this way, the enhanced release procedure is enabled.

According to some aspects, the thread insert comprises a first bearing surface and the tool holding device comprises a second bearing surface. The first bearing surface is adapted to engage the second bearing surface of the tool holding device during the following release of the tool holding device, after its initial loosening via the first thread arrangement.

According to some aspects, a sealing device is arranged between the rotatable shaft and the thread insert.

In this way, dust and liquids are prevented from entering the rotatable shaft.

According to some aspects, the tool holder is adapted to be attached to a tool that is one of a drill, a concrete mixer and a cutting tool.

According to some aspects, the first thread arrangement has a pitch in the span 10-40 mm/turn, and where the second thread arrangement has a pitch in the span 1-10 mm/turn.

According to some aspects, the rotatable shaft is adapted to be attached to a tool driving shaft by means of a third thread arrangement that has properties equal to the second thread arrangement.

According to some aspects, the rotatable shaft is fixed mounted to a core drill unit. There are also disclosed herein a thread insert, a rotatable shaft and a drill unit associated with the above-mentioned advantages.

BRIEF DESCRIPTION OF THE DRAWINGS

In the following, the present disclosure will be described in more detail with reference to preferred embodiments and the appended drawings, where.

DETAILED DESCRIPTION

Aspects of the present disclosure will now be described more fully with reference to the accompanying drawings. The different devices disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
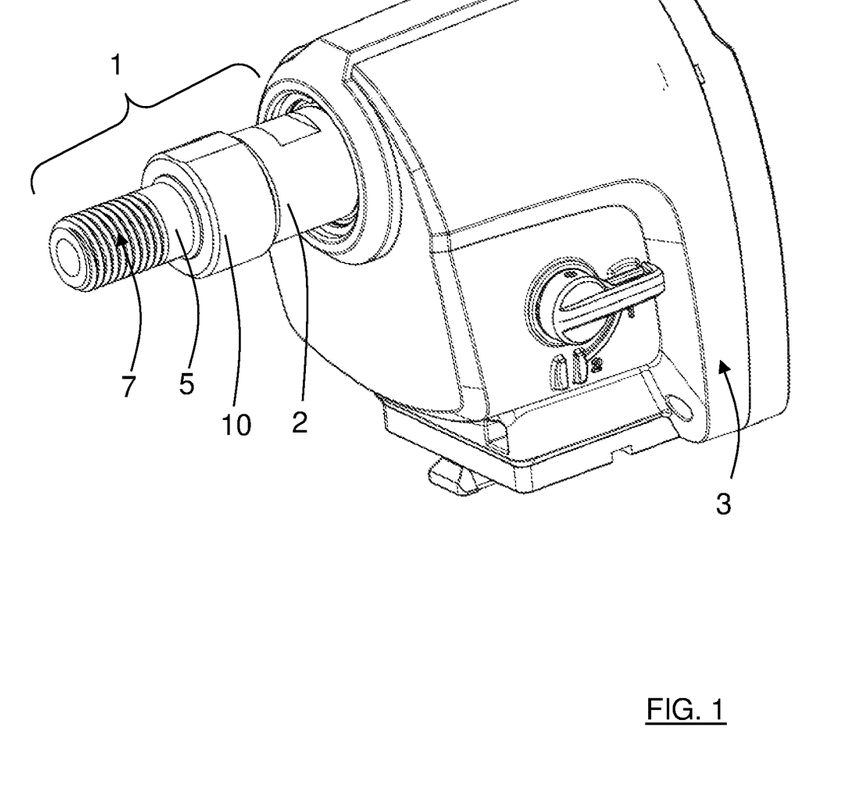
FIG. 1 shows a perspective view of an assembled tool holding arrangement according to a first example.

With reference to FIG. 1, showing a first example, there is a tool holding arrangement 1 that comprises a rotatable shaft 2 which here is shown connected to an electric tool driver 3. The electric tool driver 3, only shown partially, is of a conventional kind, and will not be further discussed here.

Figure 2:
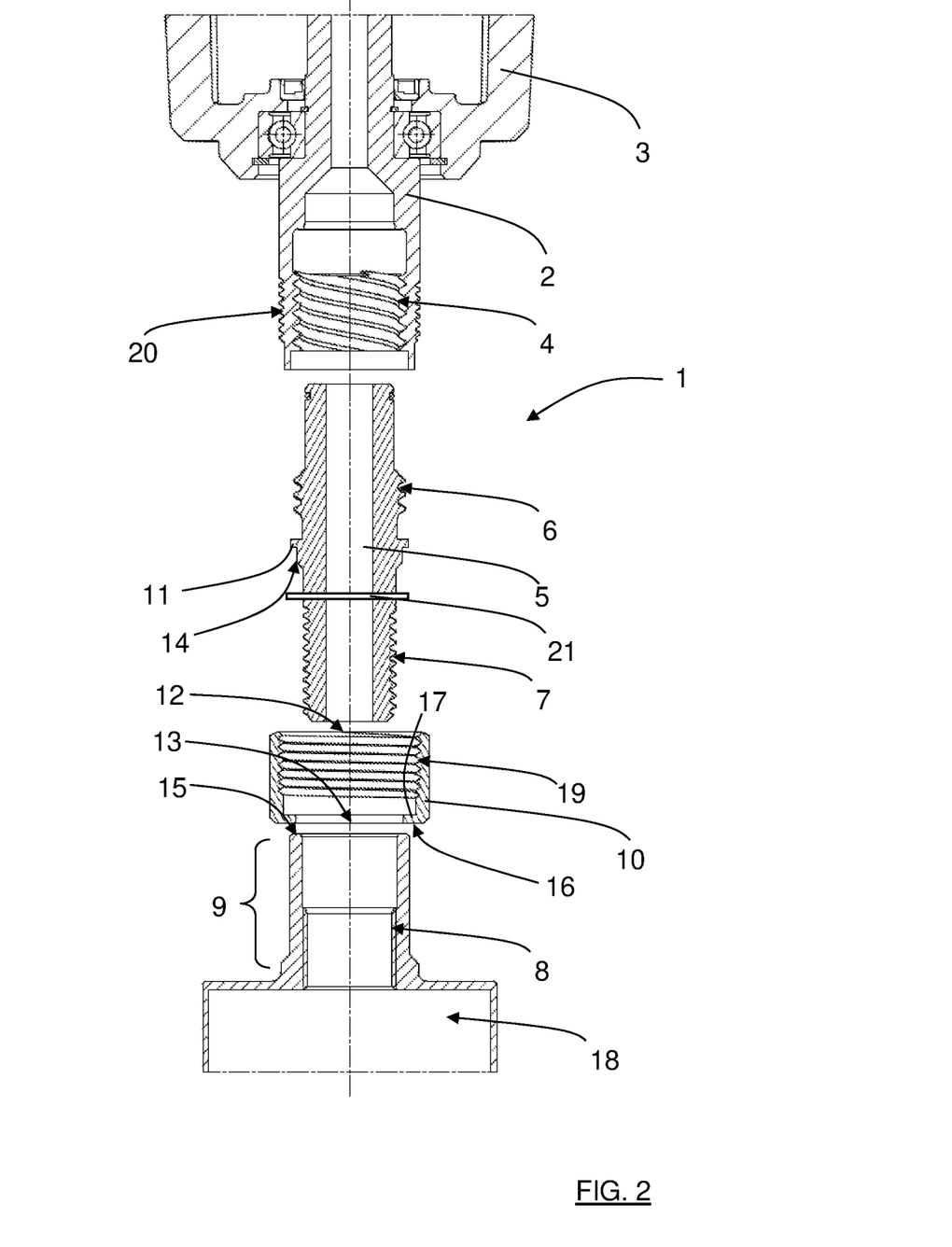
FIG. 2 shows an exploded side section view of the tool holding arrangement according to the first example.

With reference also to FIG. 2, showing an exploded view of the tool holding arrangement 1, a tool holding device 9 is arranged to be attached to the tool holding arrangement 1, and also arranged to be fastened to a suitable tool such as a drill 18, only partially indicated, by means of, for example, welding to a surface facing away from the electric tool driver 3 when mounted. According to some aspects, the tool holding arrangement 1 and the tool 18 can alternatively be formed as one integral unit.

According to the present disclosure, the tool holding arrangement 1 comprises a thread insert 5 that comprises a first insert thread 6, adapted to engage a first shaft thread 4 comprised in the rotatable shaft 2 so as to form a first thread arrangement 4, 6, where, in this example, the first shaft thread 4 is an inner thread and the first insert thread 6 is an outer thread. The thread insert 5 comprises a second insert thread 7 adapted to engage a tool thread 8 of the tool holding device 9, where the tool thread 8 is arranged to be screwed onto the second insert thread 7 so as to form a second thread arrangement 7, 8. In this example, the second insert thread 7 is an outer thread and the tool thread 8 is an inner thread. The first thread arrangement 4, 6 has a higher pitch than the second thread arrangement 7, 8.

The tool holding arrangement 1 comprises an outer sleeve 10 that is adapted to retain the thread insert 5 in movable engagement with the rotatable shaft 2 by being fastened to the rotatable shaft 2. Here, the outer sleeve 10 comprises sleeve threads 19 that are adapted to engage shaft outer threads 20 such that the outer sleeve 10 can be screwed onto the rotatable shaft 2. The thread insert 5 is retained since the thread insert 5 comprises a flange 11 and the outer sleeve 10 comprises a first aperture 12, which admits passage of the flange 11, and a second aperture 13, that is adapted to retain the flange 11 by means of a circumferentially running rim 17. The thread insert 5 is thus retained in movable engagement with the rotatable shaft 2 when the outer sleeve 10 is mounted to the rotatable shaft 2.

Figure 4:
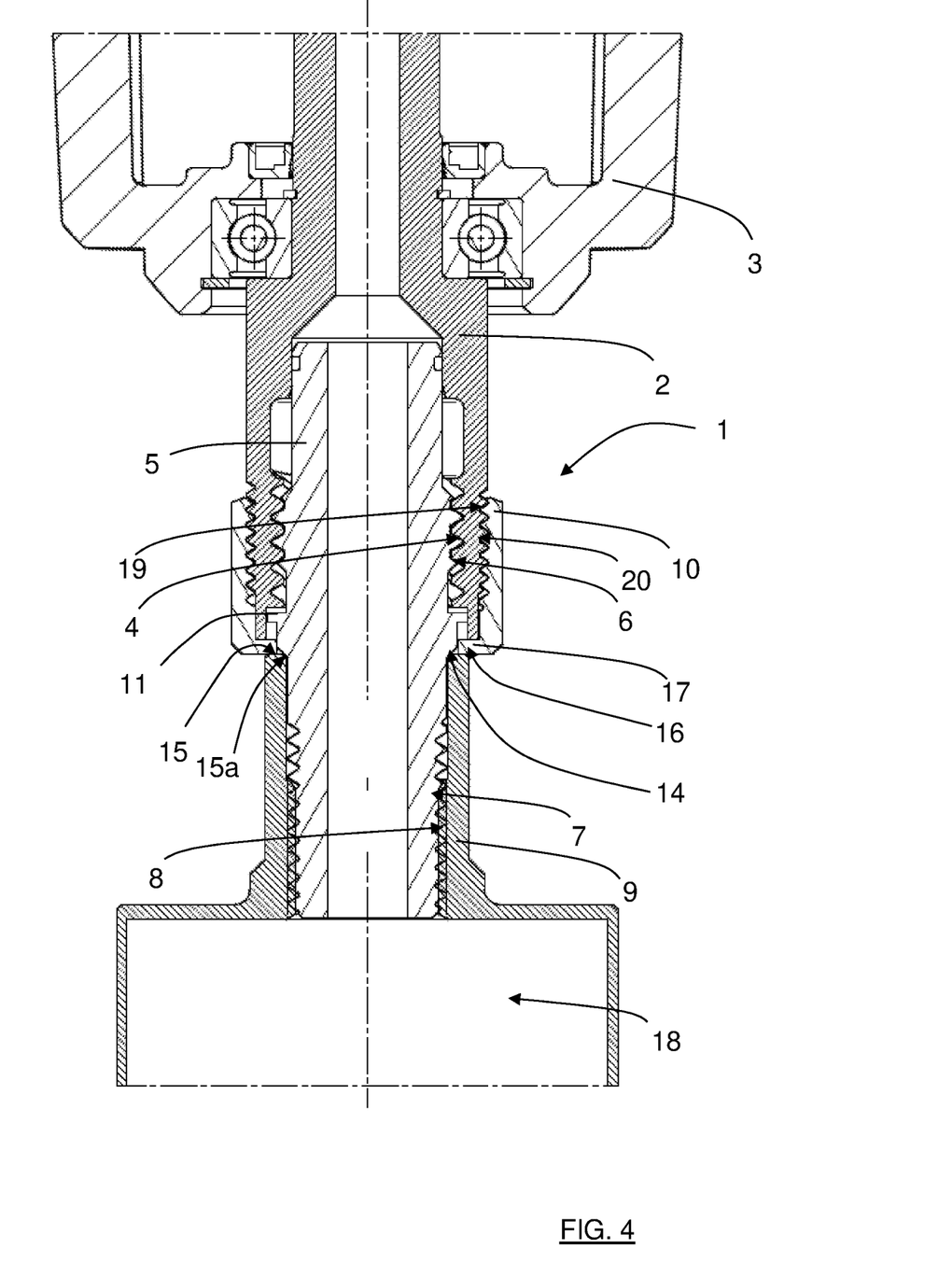
FIG. 4 shows a side section view of the tool holding arrangement according to the first example in a second position.

The thread insert 5 comprises a first bearing surface 14, the tool holding device 9 comprises a second bearing surface 15 and the outer sleeve 10 comprises a third bearing surface 16. In FIG. 4, the tool holding device 9 is secured to the rotatable shaft 2, where the second bearing surface 15 is secured against the third bearing surface 16 before initial loosening of the tool holding device 9. The loosening is accomplished by rotating the tool 18 and/or the tool holding device 9, and both friction between on one hand the second bearing surface 15 and the third bearing surface 16, and on the other hand, thread friction, have to be overcome in order to perform loosening.

Figure 3:
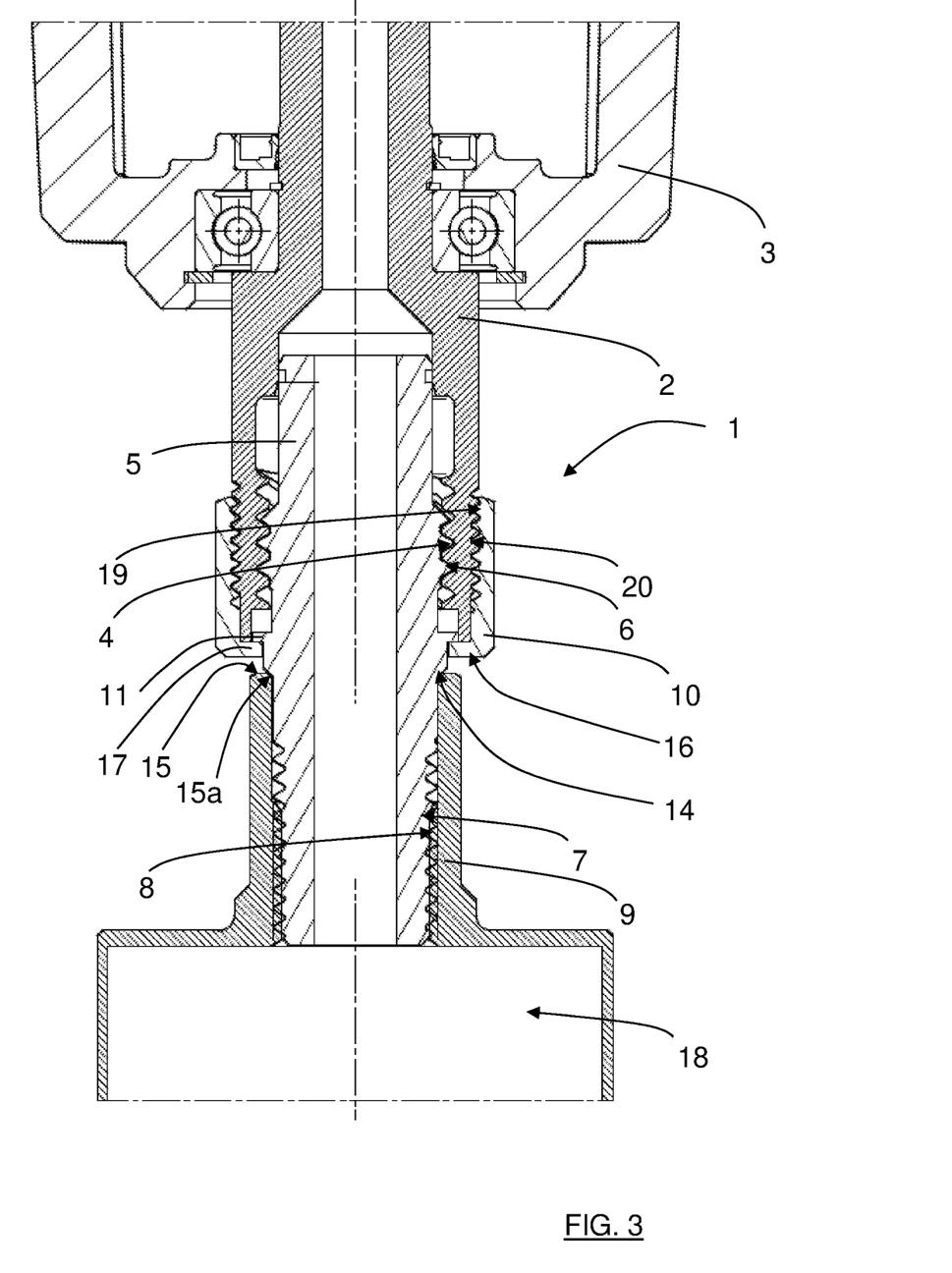
FIG. 3 shows a side section view of the tool holding arrangement according to the first example in a first position.

When the tool holding device 9 is to be released, the first thread arrangement 4, 6 is adapted for an initial loosening of the tool holding device 9, and the second thread arrangement 7, 8 is adapted for a following release of the tool holding device 9 as illustrated in FIG. 3. The initial loosening at least comprises disengagement of the second bearing surface 15 from the third bearing surface 16.

That means that the initial loosening is relatively easy due to the first thread arrangement 4, 6 having a relatively high pitch, and where the continued unscrewing of the tool holding device 9 takes place by means of the second thread arrangement 7, 8 that has a lower pitch.

According to some aspects, the lower pitch of the second thread arrangement 7, 8 follows a tool standard, and is according to some further aspects adapted to prevent the tool from loosening unintentionally It is conceivable that there can be a plurality of thread inserts 5 to choose from, where each thread insert comprises different kinds of second insert threads 7 in order to meet different standards for the tool thread 8 of the tool holding device 9, while the first insert thread 6 according to some aspects is the same for all thread inserts 5.

As shown in FIG. 3, the first bearing surface 14 can engage an inner part 15a of the second bearing surface 15 of the tool holding device 9 during the following release of the tool holding device 9, after its initial loosening via the first thread arrangement 4, 6. The first bearing surface 14 and the inner part 15a are inclined relative the rest of the second bearing surface 15 in a mutually similar manner such that friction between the bearing surface 14 and the inner part 15a is reduced.

It is according to some aspects desirable to further reduce possible friction between the first bearing surface 14 and the second bearing surface 15 in favor of friction in the thread arrangements 4, 6; 4', 6'; 7, 8, as will be discussed later. In case of low friction in the thread arrangements 4, 6; 4', 6'; 7,

8, the second bearing surface 15 can disengage the first bearing surface 14 and the third bearing surface 16 more or less at the same time.

Figure 5:
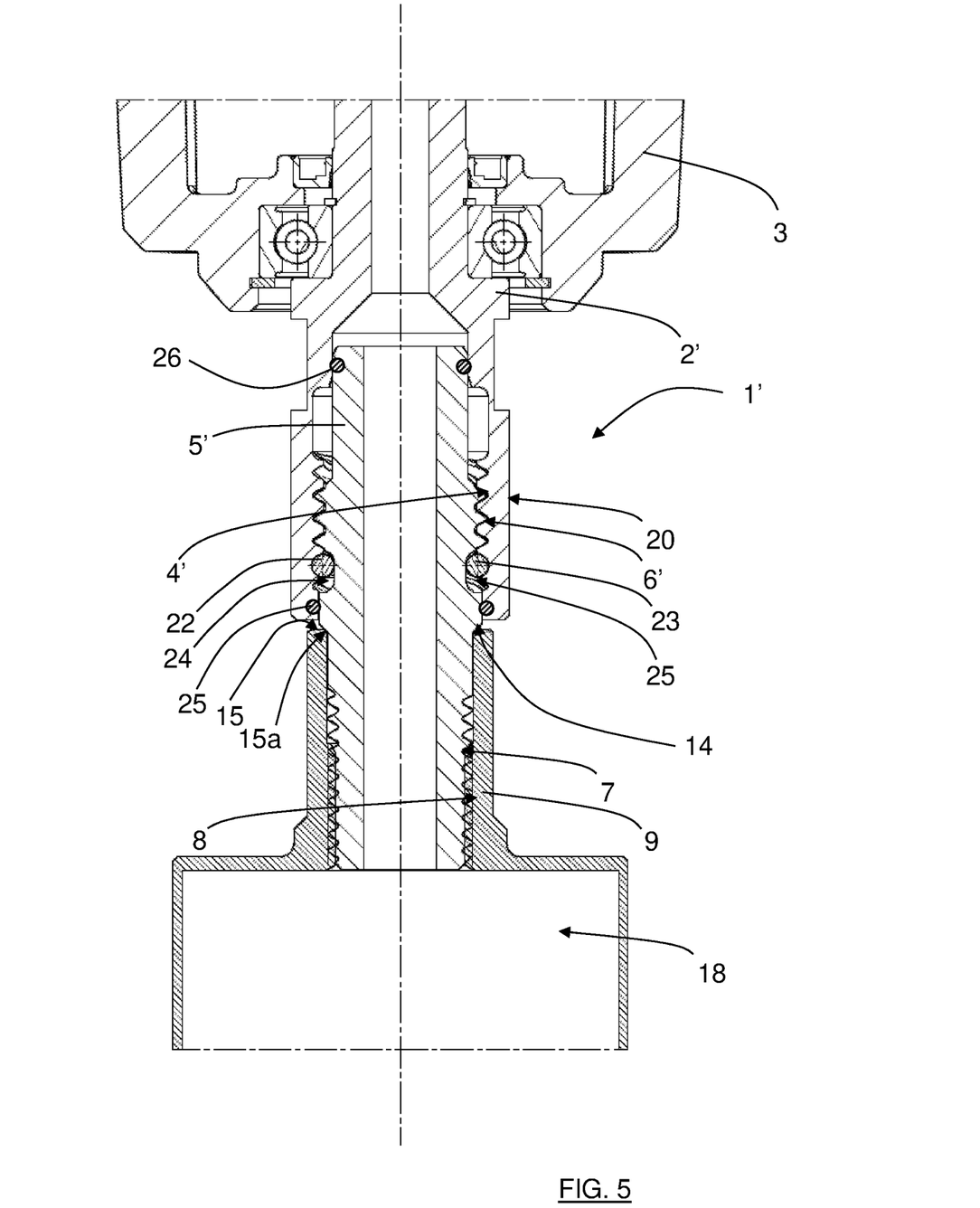
FIG. 5 shows a side section view of the tool holding arrangement according to a second example in the first position.

The outer sleeve 10 is not necessary, as will be illustrated in a following second example with reference to FIG. 5 that corresponds to FIG. 3. In FIG. 5 there is a tool holding arrangement 1' that comprises a rotatable shaft 2' connected to an electric tool driver 3. A tool holding device 9 is arranged to be attached to the tool holding arrangement 1', and also arranged to be fastened to a suitable tool such as a drill 18, only partially indicated, as for the first example.

Similarly, the tool holding arrangement 1' comprises a thread insert 5' that comprises a first insert thread 6', adapted to engage a first shaft thread 4' comprised in the rotatable shaft 2' so as to form a first thread arrangement 4', 6'. The thread insert 5' comprises a second insert thread 7 adapted to engage a tool thread 8 of the tool holding device 9', where the tool thread 8 is arranged to be screwed onto the second outer thread 7 so as to form a second thread arrangement 7, 8. The first thread arrangement 4', 6' has a higher pitch than the second thread arrangement 7, 8.

In this example, the first shaft thread 4' is an inner thread, the first insert thread 6' is an outer thread, the second insert thread 7 is an outer thread and the tool thread is an inner thread.

In the same way as in the first example, an initial loosening of the tool holding device 9 is relatively easy due to the first thread arrangement 4', 6' having a relatively high pitch, and where the continued unscrewing of the tool holding device 9 takes place by means of the second thread arrangement 7, 8 that has a lower pitch.

Here, the tool holding arrangement 1' comprises a locking pin arrangement where two locking pins 22, 23 are positioned between the rotatable shaft 2' and the thread insert 5'. Each locking pin 22, 23 is adapted to run in a circumferentially running groove 24 formed in the thread insert 5', such that the thread insert 5' is retained in movable engagement with the rotatable shaft 2' as long as the locking pins 22, 23 are inserted into place.

The thread insert 5' comprises a first bearing surface 14 and the tool holding device 9 comprises a second bearing surface 15. The first bearing surface 14 is adapted to engage the second bearing surface 15 of the tool holding device 9 during the following release of the tool holding device 9, after its initial loosening via the first thread arrangement 4', 6'.

Figure 6:
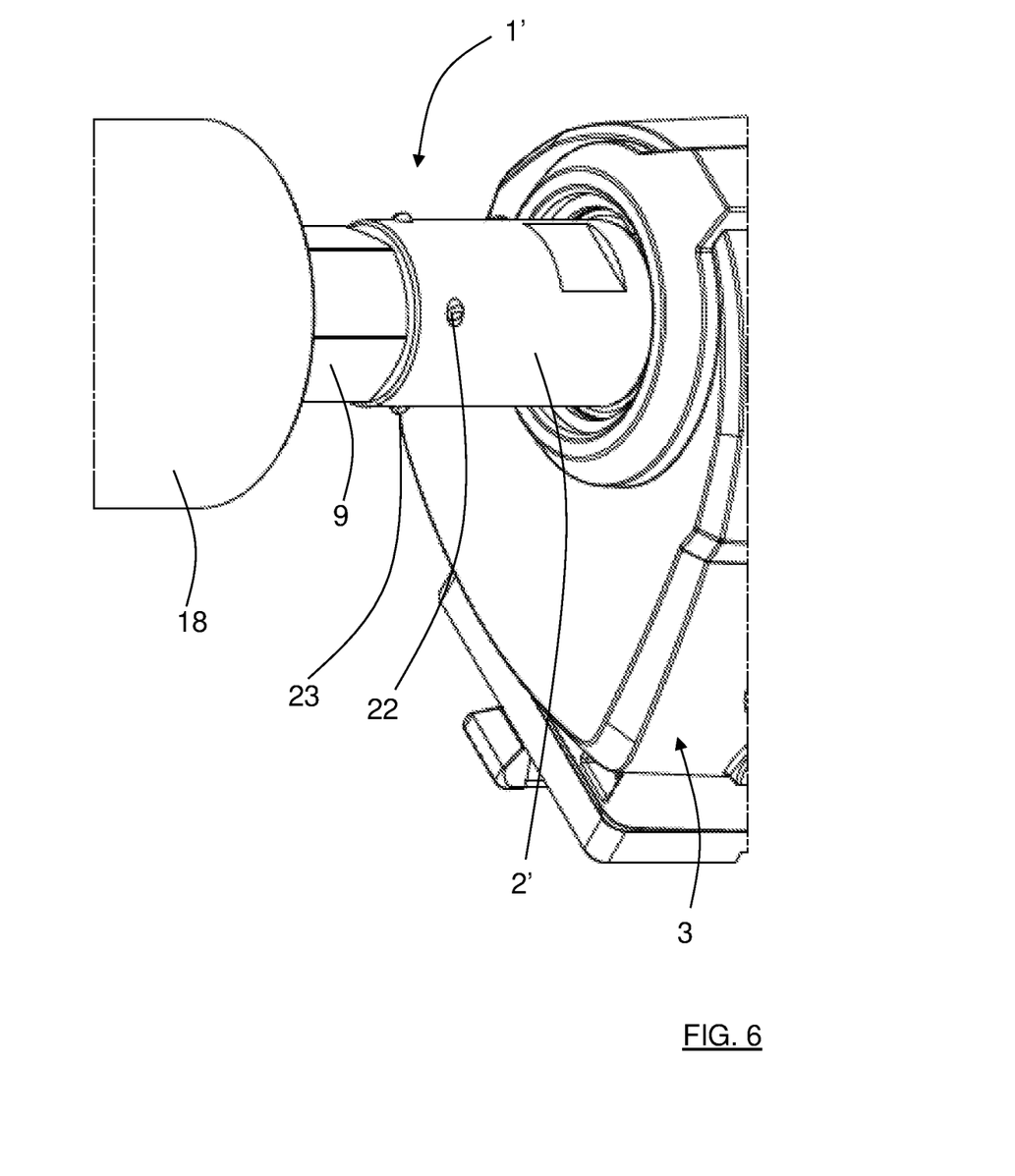
FIG. 6 shows a perspective view of an assembled tool holding arrangement according to the second example.

The locking pins 22, 23 are also shown in the perspective view of FIG. 6.

Each locking pin 22, 23 is adapted to run in the circumferentially running groove 24 between initial loosening of the tool holding device 9, and the following release of the tool holding device 9. The locking pins 22, 23 are releasable such that the thread insert 5' can be removed from the rotatable shaft 2'.

The term locking pin is not necessarily directed to a pin-shaped item, but generally other shapes are possible.

According to some aspects, a sealing device 25 is arranged between the rotatable shaft 2' and the thread insert 5' as shown in FIG. 5. Such a sealing element can also be applied for the first example, of course, although not shown. An alternative placement of a sealing device 26 is illustrated at a position closer to the tool driver 3. This could also constitute an additional sealing device.

According to some aspects, for both examples, in order to reduce possible friction between the first bearing surface 14 and the second bearing surface 15, a friction-reducing element is arranged at the first bearing surface 14, for example a PTFE (polytetrafluorethylene) washer 21 (only indicated for the first example in FIG. 2). Such an element 21 is adapted to reduce friction between the first bearing surface 14 and the second bearing surface 15. For reasons of clarity, the washer 21 is shown below the first bearing surface 14, but will lie adjacent the first bearing surface 14 when tool holding arrangement is mounted.

Generally, during mounting, the contact between the first bearing surface 14 and the second bearing surface 15 enables the thread insert 5, 5' to move axially into the rotatable shaft 2, 2' such that the first insert thread 6, 6' engages the first shaft thread 4, 4' so as to form the first thread arrangement 4, 6; 4', 6'.

The friction-reducing element can be of any type, for example a washer as described above, an O-ring or a surface treatment of the first bearing surface 14. The inclusion of any such a friction-reducing element is of course optional.

The present disclosure is not limited to the above, but may vary freely within the scope of the appended claims. For example, the rotatable shaft 2, 2' may not be directly connected to the electric tool driver 5, but may constitute an intermediate part.

The rotatable shaft 2, 2', the thread insert 5, 5' and the tool 18 are shown as hollow, but one or more of these parts may of course be solid.

The first thread arrangement 4, 6; 4', 6' comprises threads that can be of any suitable shape, constituting any type of matching protrusion/depression. These threads can according to some aspects be made of separate elements such as pins or keys.

The tool holding arrangement 1, 1' can according to some aspects comprise a resilient elements such as a spring (not shown) that biases the thread insert 5, 5' towards a certain position.

The outer sleeve 10 can be fastened to the rotatable shaft 2 in many ways, for example by press-fitting or snap-fitting.

According to some aspects, the first thread arrangement 4, 6; 4', 6' has a pitch in the span 10-40 mm/turn, and the second thread arrangement 7, 8 has a pitch in the span 1-10 mm/turn. Other pitch intervals are of course conceivable, for example in dependence of the size of the rotatable shaft 2, 2', the thread insert 5, 5' and the tool holding device 9.

In the examples shown, the rotatable shaft 2, 2' according to the present disclosure has been shown mounted to the electric tool driver 3. The electric tool driver 3 has here been adapted to directly receive the rotatable shaft 2, 2' according to the present disclosure. The rotatable shaft and the tool holding arrangement according to the present disclosure can, however, be adapted for mounting to a tool driver having an ordinary standard shaft that is adapted for direct mounting to a tool holder.

Figure 7:
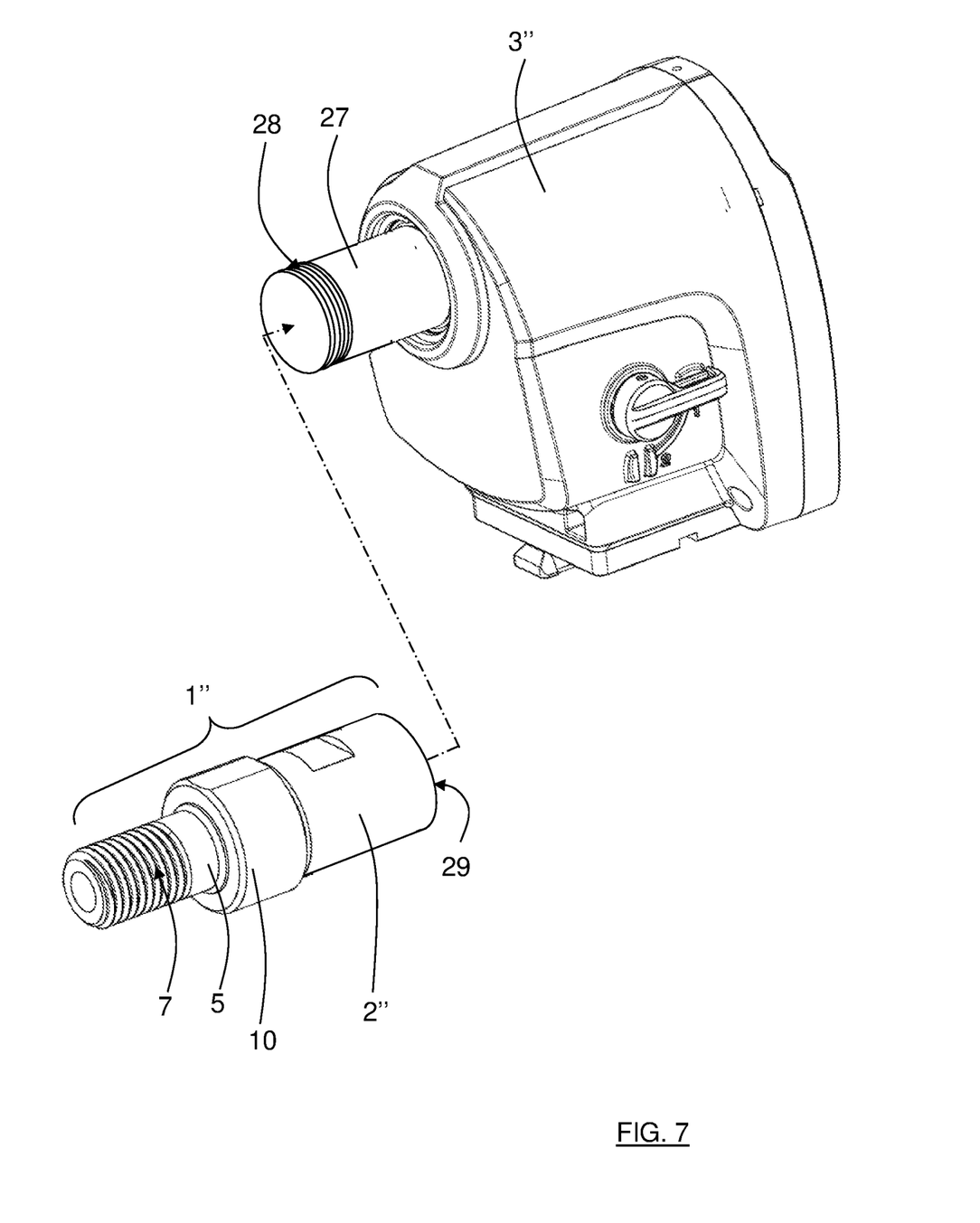
FIG. 7 shows a perspective view of a legacy electric tool driver with a pre-mounted standard shaft, and an assembled tool holding arrangement according to a third example.

According to some aspects, with reference to FIG. 7 showing a third example, there is an electric tool driver 3" with a standard shaft 27 that is adapted for direct mounting to a tool holder by means of a standard thread 28 that is adapted to engage a tool thread 8 of a tool holding device 9 as, for example, shown in FIG. 2. Here, however, there is a tool holding arrangement 1" that comprises a shaft 2" that in turn comprises a standard shaft thread 29 that is adapted to engage the standard thread 28 of the standard shaft 27 so as to form a third thread arrangement 28, 29.

The rotatable shaft 2" is thus adapted to be attached to the standard shaft 27 by means of the third thread arrangement 28, 29 that, according to some aspects, has properties equal to the second thread arrangement 7, 8. The other parts of the tool holding arrangement 1" can be of the same kinds as discussed in the previous examples.

In this manner, the rotatable shaft, being provided with a standard shaft thread 29, enables the tool holding arrangement 1" to be mounted to a legacy tool driver 3" having an ordinary standard shaft 27 that is adapted for direct mounting to a tool holder.

The electric tool driver 3 is generally constituted by a tool driving power source in the form of a drill unit 3, such as a drill unit which may be run by hand or by means of a motor that may be electric or of a combustion type.

According to some aspects, the first shaft thread 4, 4' is an outer thread and the first insert thread 6, 6' is an inner thread where these threads are adapted to engage each other so as to form the first thread arrangement.

The second insert thread 7 is normally an outer thread since the corresponding tool thread 8 of the tool holding device normally is an inner thread. The reverse in of course possible.

According to some aspects, the thread insert is retained in movable engagement with the rotatable shaft, either by means of the tool holding arrangement comprising an outer sleeve or by means of locking pins or similar as previously described. Many other means and arrangements for retaining the thread insert in movable engagement with the rotatable shaft are of course conceivable, and generally the thread insert is retained in movable engagement with the rotatable shaft.

According to some aspects, the thread insert is not retained in movable engagement with the rotatable shaft, but may be unscrewed and released from the rotatable shaft. In this manner, according to a first alternative, when the tool holding device 9 is to be released, the first thread arrangement 4, 6; 4', 6' is adapted for an initial loosening of the tool holding device 9, and, the second thread arrangement 7, 8 is adapted for a following release of the tool holding device 9. According to a second alternative, it is conceivable that the first thread arrangement 4, 6; 4', 6' is adapted for an initial loosening of the tool holding device as well as for at least a part of the following release of the tool holding device 9. This means that the first thread arrangement 4, 6; 4', 6' can be adapted for a complete loosening of the tool holding device.

Generally, the present disclosure relates to a tool holding arrangement 1, 1', 1" comprising a rotatable shaft 2, 2', 2" which is at least connectable to a drill unit 3 and comprises a first shaft thread 4, 4'. The tool holding arrangement 1, 1', 1" comprises a thread insert 5, 5' that comprises a first insert thread 6, 6', adapted to engage the first shaft thread 4, 4' so as to form a first thread arrangement 4, 6; 4', 6', and a second insert thread 7 adapted to engage a tool thread 8 of a tool holding device 9 that is arranged to be screwed onto the second insert thread 7 so as to form a second thread arrangement 7, 8, the first thread arrangement 4, 6; 4', 6' having a higher pitch than the second thread arrangement 7, 8.

According to some aspects, when the tool holding device 9 is to be released, the first thread arrangement 4, 6; 4', 6' is adapted for an initial loosening of the tool holding device 9, and the second thread arrangement 7, 8 is adapted for a following release of the tool holding device 9.

According to some aspects, the tool holding arrangement 1 comprises an outer sleeve 10 that is adapted to retain the thread insert 5 in movable engagement with the rotatable shaft 2 by being fastened to the rotatable shaft 2.

According to some aspects, the thread insert 5 comprises a flange 11, and where the outer sleeve 10 comprises a first aperture 12 that admits passage of the flange 11, and a second aperture 13 that is adapted to retain the flange 11 by means of a circumferentially running rim 17 such that the thread insert 5 is retained in movable engagement with the rotatable shaft 2 when the outer sleeve 10 is mounted to the rotatable shaft 2.

According to some aspects, the outer sleeve 10 comprises sleeve threads 19 that are adapted to engage shaft outer threads 20 such that the outer sleeve 10 can be screwed onto the rotatable shaft 2.

According to some aspects, the thread insert 5 comprises a first bearing surface 14, the tool holding device 9 comprises a second bearing surface 15 and the outer sleeve 10 comprises a third bearing surface 16 against which the second bearing surface 15 is secured before initial loosening of the tool holding device 9, and where the first bearing surface 14 is adapted to engage the second bearing surface 15 of the tool holding device 9 during the following release of the tool holding device 9.

According to some aspects, a friction-reducing element is arranged at the first bearing surface 14.

According to some aspects, the tool holding arrangement 1' comprises a locking pin arrangement where at least one locking pin 22, 23 is positioned between the rotatable shaft 2' and the thread insert 5', and is adapted to run in a circumferentially running groove 24 formed in the thread insert 5', such that the thread insert 5' is retained in movable engagement with the rotatable shaft 2'.

According to some aspects, each locking pin 22, 23 is adapted to run in the circumferentially running groove 24 between initial loosening of the tool holding device 9, and the following release of the tool holding device 9.

According to some aspects, the thread insert 5' comprises a first bearing surface 14 and the tool holding device 9 comprises a second bearing surface 15, where the first bearing surface 14 is adapted to engage the second bearing surface 15 of the tool holding device 9 during the following release of the tool holding device 9, after its initial loosening via the first thread arrangement 4', 6'.

According to some aspects, a sealing device 25, 26 is arranged between the rotatable shaft 2, 2', 2" and the thread insert 5, 5'.

According to some aspects, the tool holder 9 is adapted to be attached to a tool 18 that is one of:
a drill,
a concrete mixer. and
a cutting tool.

According to some aspects, the first thread arrangement 4, 6; 4', 6' has a pitch in the span 10-40 mm/turn, and where the second thread arrangement 7, 8 has a pitch in the span 1-10 mm/turn.

According to some aspects, the rotatable shaft 2" comprises a standard shaft thread 29 that is adapted to engage the standard thread 28 of a standard shaft 27 that is comprised in a drill unit 3.

According to some aspects, the rotatable shaft 2, 2', 2" is fixed mounted to a core drill unit 3.

Generally, the present disclosure also relates to a thread insert 5, 5' that comprises a first insert thread 6, 6' and a second insert thread 7. The first insert thread 6, 6' is adapted to engage the first shaft thread 4, 4' of a rotatable shaft 2, 2', 2" so as to form a first thread arrangement 4, 6; 4', 6', and in that the second insert thread 7 is adapted to engage a tool inner thread 8 of a tool holding device 9 that is arranged to be screwed onto the second insert thread 7 so as to form a second thread arrangement 7, 8, the first insert thread 6, 6' having a higher pitch than the second insert thread 7.

According to some aspects, the first thread arrangement 4, 6; 4', 6' is adapted for an initial loosening of the tool holding device 9, and the second thread arrangement 7, 8 is adapted for a following release of the tool holding device 9.

According to some aspects, the thread insert 5 comprises a first bearing surface 14 that is adapted to engage a second bearing surface 15 of the tool holding device 9 during the following release of the tool holding device 9.

According to some aspects, a friction-reducing element is arranged at the first bearing surface 14.

According to some aspects, the thread insert 5, 5' comprises a locking pin arrangement where at least one locking pin 22, 23 is adapted to be positioned between the thread insert 5' and the rotatable shaft 2', and is adapted to run in a circumferentially running groove 24 formed in the thread insert 5', such that the thread insert 5' is enabled to be retained in movable engagement with the rotatable shaft 2'.

According to some aspects, each locking pin 22, 23 is adapted to run in the circumferentially running groove 24 between initial loosening of the tool holding device 9, and a following release of the tool holding device 9.

According to some aspects, the thread insert 5, 5' comprises a sealing device 25, 26 that is adapted to be arranged between the thread insert 5, 5' and the rotatable shaft 2, 2', 2".

According to some aspects, the first insert thread 6, 6' has a pitch in the span 10-40 mm/turn, and where the second insert thread 7 has a pitch in the span 1-10 mm/turn.

Generally, the present disclosure also relates to a rotatable shaft 2, 2', 2" that is at least connectable to a drill unit 3. The rotatable shaft 2, 2', 2" comprises a first shaft thread 4, 4' adapted to engage a first insert thread 6, 6' of a thread insert 5, 5' that in turn is attachable to a tool holding device 9.

According to some aspects, the first shaft thread 4, 4' has a pitch in the span 10-40 mm/turn.

According to some aspects, the rotatable shaft 2" comprises a standard shaft thread 29 that is adapted to engage the standard thread 28 of a standard shaft 27 that is comprised in a drill unit 3.

Generally, the present disclosure also relates to a drill unit, such as a core drill unit 3, comprising a tool holding arrangement 1, 1', 1".

The invention claimed is:

1. A tool holding arrangement comprising a rotatable shaft which is at least connectable to a drill unit and comprises a first shaft thread wherein the tool holding arrangement comprises a thread insert that comprises a first insert thread, adapted to engage the first shaft thread so as to form a first thread arrangement, and a second insert thread adapted to engage a tool thread of a tool holding device that is arranged to be screwed onto the second insert thread so as to form a second thread arrangement, the first thread arrangement having a higher pitch than the second thread arrangement, wherein the tool holding arrangement comprises an outer sleeve that is adapted to retain the thread insert in movable engagement with the rotatable shaft by being fastened to an outer surface of the rotatable shaft.

2. The tool holding arrangement according to claim 1, wherein, when the tool holding device is to be released, the first thread arrangement is adapted for an initial loosening of the tool holding device, and the second thread arrangement is adapted for a following release of the tool holding device.

3. The tool holding arrangement according to claim 1, wherein the thread insert comprises a flange, and wherein the outer sleeve comprises a first aperture that admits passage of the flange, and a second aperture that is adapted to retain the flange by a circumferentially running rim such that the thread insert is retained in movable engagement with the rotatable shaft when the outer sleeve is mounted to the rotatable shaft.

4. The tool holding arrangement according to claim 3, wherein the outer sleeve comprises sleeve threads that are adapted to engage shaft outer threads such that the outer sleeve can be screwed onto the rotatable shaft.

5. The tool holding arrangement according to claim 3, wherein the rotatable shaft extends over a portion of the thread insert up to the flange, engaging with the first insert thread.

6. The tool holding arrangement according to claim 1, wherein the thread insert comprises a first bearing surface, the tool holding device comprises a second bearing surface and the outer sleeve comprises a third bearing surface against which the second bearing surface is secured before initial loosening of the tool holding device, and wherein the first bearing surface is adapted to engage the second bearing surface of the tool holding device during the following release of the tool holding device.

7. The tool holding arrangement according to claim 6, wherein a friction-reducing element is arranged at the first bearing surface.

8. The tool holding arrangement according to claim 1, wherein the tool holding arrangement comprises a locking pin arrangement where at least one locking pin is positioned between the rotatable shaft and the thread insert, and is adapted to run in a circumferentially running groove formed in the thread insert, such that the thread insert is retained in movable engagement with the rotatable shaft.

9. The tool holding arrangement according to claim 8, wherein each locking pin is adapted to run in the circumferentially running groove between initial loosening of the tool holding device, and the following release of the tool holding device.

10. The tool holding arrangement according to claim 8, wherein the thread insert comprises a first bearing surface and the tool holding device comprises a second bearing surface, wherein the first bearing surface is adapted to engage the second bearing surface of the tool holding device during the following release of the tool holding device, after its initial loosening via the first thread arrangement.

11. The tool holding arrangement according to claim 1, wherein a sealing device is arranged between the rotatable shaft and the thread insert.

12. The tool holding arrangement according to claim 1, wherein the tool holder is adapted to be attached to a tool that is one of:
a drill,
a concrete mixer, and
a cutting tool.

13. The tool holding arrangement according to claim 1, wherein the first thread arrangement has a pitch in a span 10-40 mm/turn, and wherein the second thread arrangement has a pitch in a span 1-10 mm/turn.

14. The tool holding arrangement according to claim 1, wherein the rotatable shaft comprises a standard shaft thread that is adapted to engage the standard thread of a standard shaft that is comprised in a drill unit, or
wherein the rotatable shaft is fixed mounted to a core drill unit.

* * * * *

UNITED STATES PATENT AND TRADEMARK OFFICE
CERTIFICATE OF CORRECTION

| | | |
|---|---|---|
| PATENT NO. | : 12,377,472 B2 | Page 1 of 1 |
| APPLICATION NO. | : 17/433726 | |
| DATED | : August 5, 2025 | |
| INVENTOR(S) | : David Grennhag | |

It is certified that error appears in the above-identified patent and that said Letters Patent is hereby corrected as shown below:

On the Title Page

In Item (72), "David Grennhag, Källered (SE)" should read --David Grennhag, Kållered (SE)--

Signed and Sealed this
Eighteenth Day of November, 2025

John A. Squires
*Director of the United States Patent and Trademark Office*